US007454794B1

(12) United States Patent
Hibberd

(10) Patent No.: US 7,454,794 B1
(45) Date of Patent: Nov. 18, 2008

(54) ACCESS CONTROL METHOD

(75) Inventor: Timothy Winston Hibberd, Neutral Bay (AU)

(73) Assignee: Telstra Corporation Limited, Melbourne, Victoria (AU)

( * ) Notice: Subject to any disclaimer, the term of this patent is extended or adjusted under 35 U.S.C. 154(b) by 941 days.

(21) Appl. No.: 10/088,034

(22) PCT Filed: Sep. 13, 2000

(86) PCT No.: PCT/AU00/01095

§ 371 (c)(1),
(2), (4) Date: Aug. 26, 2002

(87) PCT Pub. No.: WO01/20462

PCT Pub. Date: Mar. 22, 2001

(30)  Foreign Application Priority Data

Sep. 13, 1999  (AU)  .................................. PQ 2787

(51) Int. Cl.
G06K 7/04     (2006.01)
G06K 15/16    (2006.01)
H04K 1/00     (2006.01)
H04L 9/00     (2006.01)

(52) U.S. Cl. ................................ 726/27; 726/2; 726/26; 726/28; 713/168; 713/182; 713/193; 709/217; 709/219; 709/225; 709/229

(58) Field of Classification Search .................... 726/27, 726/2, 5, 26, 28; 713/168, 182, 193; 709/217, 709/219, 225, 229; 379/88.02, 91.01, 142.05, 379/142.06
See application file for complete search history.

(56) References Cited

U.S. PATENT DOCUMENTS

| 3,525,646 A | 8/1970 | Tannenberger et al. ........ 136/86 |
| 5,085,742 A | 2/1992 | Dollard et al. .............. 205/108 |
| 5,273,837 A | 12/1993 | Aitken et al. .................. 429/30 |

(Continued)

FOREIGN PATENT DOCUMENTS

EP    0 442 742 A1   8/1991

(Continued)

OTHER PUBLICATIONS

M. Naor, "*Verification of a Human in the Loop or Identification via the Turning Test—A Preliminary Draft*", Dept. of Applied Mathematics and Computer Science, Weizmann Institute of Science, Rehovot 76100, (Sep. 13, 1996), pp. 0-5.

(Continued)

*Primary Examiner*—Benjamin E. Lanier
*Assistant Examiner*—Abdulhakim Nobahar
(74) *Attorney, Agent, or Firm*—Dorsey & Whitney LLP

(57) ABSTRACT

An access control method executed by a computer system, including applying an access rate limit until a user issuing access requests is verified, a first control level involving verifying the user, a second control level applying hack program detection tests to the access requests and verifying the user, a third control level requiring use of predetermined download software for transmitting the access requests and verifying the user, a fourth control level blocking access to the service on the basis of at least one communications address corresponding to the access requests, and invoking the control levels sequentially depending on a number of failed attempts to verify the user.

28 Claims, 2 Drawing Sheets

U.S. PATENT DOCUMENTS

| | | | |
|---|---|---|---|
| 5,343,529 | A | 8/1994 | Goldfine et al. |
| 5,495,235 | A | 2/1996 | Durinovic-Johri et al. |
| 5,495,521 | A | 2/1996 | Rangachar |
| 5,559,505 | A | 9/1996 | McNair |
| 5,724,423 | A * | 3/1998 | Khello ................. 713/184 |
| 5,790,642 | A | 8/1998 | Taylor et al. |
| 5,949,875 | A | 9/1999 | Walker et al. |
| 6,161,185 | A * | 12/2000 | Guthrie et al. ............. 726/5 |
| 6,195,698 | B1 | 2/2001 | Lillibridge et al. |
| 6,418,472 | B1 * | 7/2002 | Mi et al. ................. 709/229 |
| 7,206,805 | B1 * | 4/2007 | McLaughlin, Jr. ........ 709/203 |

FOREIGN PATENT DOCUMENTS

| | | |
|---|---|---|
| EP | 0 444 351 A2 | 9/1991 |
| EP | 0 577 420 A1 | 1/1994 |
| EP | 0 862 104 A2 | 9/1998 |
| EP | 0 880 259 A2 | 11/1998 |
| JP | 10-064551 | 3/1998 |
| JP | 2000-151570/14 | 5/2000 |
| WO | WO 99/13522 | 3/1999 |
| WO | WO 99/17390 | 4/1999 |
| WO | WO 2005/006953 A2 | 1/2005 |

OTHER PUBLICATIONS

Unknown, "*First Use- Alta Vista*", :PARC, Palo Alter Research Center, (Feb. 28, 2003) pp. 1-3, web address: http://www2.parc.com/istl/projects/captcha/history.htm.

Wikipedia, "*CAPTCHA*" Wikipedia, the free encyclopedia, (2007), pp. 1-8, web address: http://en.wikipedia.org/wiki/Captcha.

* cited by examiner

ACCESS CONTROL METHOD

FIELD OF THE INVENTION

The present invention relates to an access control method and to a system and a computer program for executing the method.

BACKGROUND OF THE INVENTION

One of the perennial problems with providing services over a communications network, such as the Internet, is the vulnerability of the system providing the service to damage or attack by malicious parties, such as computer hackers. Particularly for service provision over the Internet, services, such as information provision and communication services, may be accessed using scripts or applets which the hackers can attempt to replicate in programs to execute excessive access requests for the service. The excessive access requests, depending on their nature, can have a variety of effects on the service and in some circumstances may cause the service system to collapse.

Detecting a spurious access request or "hack" by a hacker is problematic for any service provider and a considerable number of security procedures have been developed to try and protect systems from a hack. Hackers however have proven particularly adept at being able to circumvent all forms of security procedures and systems which seek to deny them access. Given the computing resources and skills which the hacking community possess, an alternative approach to protecting service provision systems is needed.

SUMMARY

In accordance with the present invention there is provided an access control method performed by an access control system, including:

receiving an access request for a service from a data processing apparatus;

sending unique identification data to said apparatus in response to said access request; and applying a rate limit for verifying access to said service, using an access request queue, until said identification data is received from a user of said apparatus and verified by said access control system.

The present invention also provides an access control method executed by a computer system, including:

applying an access rate limit, using an access request queue, until a user issuing access requests is verified by said computer system;

invoking a first control level involving attempting to verify said user;

invoking a second control level applying hack program detection tests to said access requests and attempting to verify said user;

invoking a third control level requiring use of predetermined download software for transmitting said access requests and attempting to verify said user;

invoking a fourth control level blocking access to said service on the basis of at least one communications address corresponding to said access requests; and invoking said control levels sequentially depending on a number of failed attempts to verify said user.

The present invention also provides an access control system having components for executing the steps of the method.

The present invention also provides an access control software stored on a computer system, having code for executing the steps of the access control method The present invention also provides an access control system, including:

an access control server for receiving access requests for a service from a data processing apparatus, using an access request queue, until a user of said apparatus is verified, and sending to said data processing apparatus unique identification data; and an interactive voice response system for contacting an independent communications device having an association with said user and said data processing apparatus, issuing a request for said identification data, and providing the identification data received from said user in response to said request to said access server in order to verify said user.

DESCRIPTION OF DRAWINGS

A preferred embodiment of the present invention is hereinafter described, by way of example only, with reference to the accompanying drawings, wherein.

DETAILED DESCRIPTION

Figure 1:
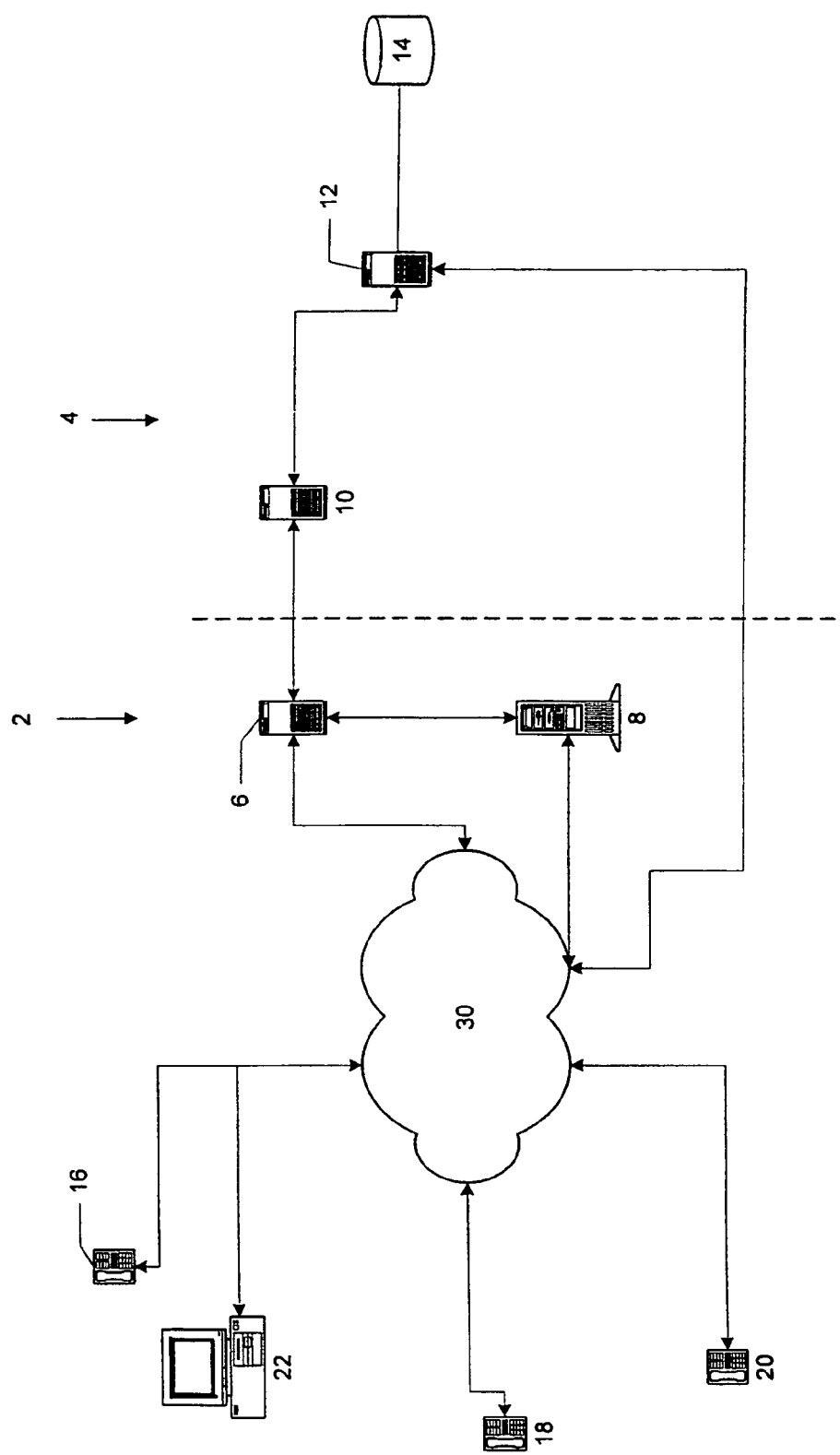
FIG. 1 is a block diagram of a preferred embodiment of an access control system connected to a communications network.

An access control system 2, as shown in FIG. 1, is used to limit access to and protect a service provision system 4. The access control system 2 includes an access control server 6 and an interactive voice response system (IVR) 8 which are both connected to a communications network 30 and to each other. The service system 4 includes a network server 10 connected to the access server 6, and an application server 12 connected to the network server 10 and having access to a database 14. The application server 12 executes the application to provide a service over the network 30 using the data contained in the database 14. The application server 12 gains access to the network 30 via the network server 10, which may be a web server to handle communications with the network using HTTP. The access server 6 is also able to communicate with the network 30 using HTTP and other protocols as necessary. The network 30 includes the Internet and other data and voice delivery networks, such as a public switched telephone network (PSTN). Although the servers 6, 10 and 12 and the IVR 8 are shown as separate machines, the machines can be integrated into one machine or divided into different machines which may be distributed and communicate remotely, as will be understood by those skilled in the art. The latter involves distributing the software components of the servers 6, 10 and 12 and the IVR 8 amongst the different machines.

The preferred embodiment is described below with reference to the provision of a service for executing icon calling, where the application server 12 allows parties (an A party) using a data processing apparatus 22 (i.e. a computer) to access directory or telephone information concerning another party (the B party) via a web site, and then select a call icon on a page of the site to establish a call between the A and B parties. This involves the application server 12 instructing the network 30 to place a call to a telephone 16 of the A party and a telephone 18 or 20 of the B party. Further details concerning the system required to support the service is provided in the applicant's Australian Patent Application No. 19173/97. It will of course be apparent to a skilled addressee that the access control method executed by the system 2 described below can be applied to any service delivered over the communications network 30.

The access control method is executed by a computer program stored on the access control server 6 which communicates with and uses the standard features of the IVR 8, such as those provided with the IVRs produced by Periphonics Corporation or Dialogic Corporation. Again, the program could be distributed or its processes executed by dedicated hardware, such as application specific integrated circuits (ASICs), as will be understood by those skilled in the art.

The access control method adopts a different approach to standard security methods, in that it is assumed that a hacker using the apparatus 22 will eventually be able to penetrate any defenses, and therefore allows legitimate users to use the system 4 whilst it is under attack. The method seeks to limit the number of access requests for the service that a hacker can make whilst moving through different control levels as the number of access attempts increase over monitored periods of time. For the icon calling service this means limiting the number of prank calls to the same as that which could be made from a telephone. In other words, this involves rate limiting the number of requests to the same level at which call requests could be made from a telephone. Whilst the access limit is in place, if a user is not verified, the control levels will move through a second hack detection level, a third software download level and a fourth level where access is completely blocked for the apparatus 22.

The data processing apparatus 22 does not provide any unique identification (ID) when making an access request to the system 4 which can be used by the access control system 2, because an IP address is not unique for a machine 22 which is sharing a proxy server with other machines. The method therefore involves creating an ID which is stamped on the requesting machine 22. Supplementary information delivery strategies currently supported by web browsers are cookie files and Secured Sockets Layer (SSL) client certificates, but as the availability of client certificates cannot be relied upon, the method uses encrypted cookie files, as described below. The A party user or the telephone 16 of the requesting A party is verified by executing an IVR based security check. The access control server 6 instructs the IVR 8 to place a call to the telephone 16 designated in the call request, and the answering party is asked to enter or divulge a unique code which is sent to the machine 22 for display by the access control server 6. The IVR 8 then reports back to the server 6 the code provided using the telephone 16. If the sent and received security codes correspond the A party is verified. A rate limit is therefore applied to a request having an IP address identifying the machine 22 until this IVR verification has been successfully completed.

The control levels of the access control method described below apply to unverified A party numbers from a given IP address. If m or more IP addresses in a segment are operating under a control level (m being an integer greater than or equal to 2), an entire IP segment, i.e. 256 addresses, is tagged as being in a control level. This provides protection from a hacker who is cycling through IP addresses in a segment. However, it is not until the fourth control level is reached that any IP address or segment blocking occurs, as this is potentially serious given that an entire proxy server can be blocked.

The first control level rate limits access requests so that the service is not denied to legitimate users and the telephone network is not adversely affected. At this level, the access method executes the IVR based verification or validation check, which additionally ensures that a computer 22 has been configured correctly.

Figure 2:
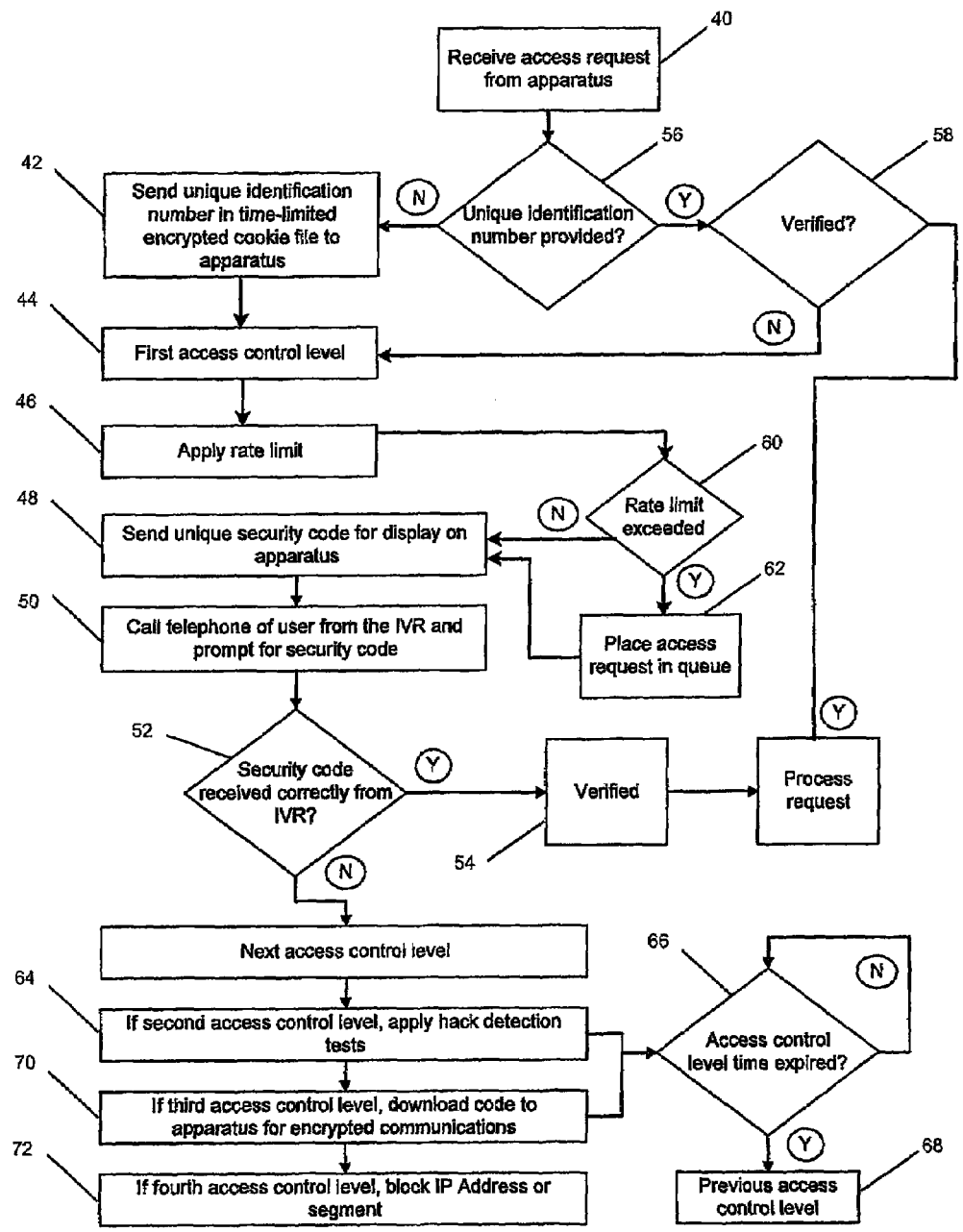
FIG. 2 is a flow chart of an access control method performed by the access control system.

FIG. 2 is a flow chart of an exemplary access control method performed by the access control system. When an initial access request is made by the data processing apparatus 22 (step 40), the access control system 6 treats this initial access request as a request to register with the system 4 and enters a registration validation procedure where a time-limited encrypted cookie file encoded with a unique identification number is sent (step 42) for storage at the machine 22 and can be used to make one call. As stated above, a first access control level (step 44) applies a rate limit (step 46) for the apparatus 22. When the A party is called for the first time, a random unique security code, which in this instance can be text based, is sent for display on the computer 22 (step 48) and the IVR 8 is instructed by the access control system 6 to provide a prompt for the answering party at the telephone 16 to provide the displayed security code (step 50). If the security code is entered correctly by the answering party (step 52), using DTMF signals generated by pressing the buttons on the telephone 16, the data processing apparatus 22 is verified (step 54) and the time limit in the encrypted cookie is cancelled and the number of calls that can be made is changed to unlimited. The B party is then called on the telephone 18 or 20. Once the security code is verified the identification number in the cookie is sent with access requests (step 56) to the application system 4 for verification (step 58).

The following rate limits are continuously imposed by the access control server 6 for unverified access requests:
1. One concurrent call per machine identification (ID), which is the preferred cookie ID rather than a SSL certificate ID.
2. One concurrent call per A party 16, identified by the A party number.
3. X concurrent calls per access system 2, which is the number of concurrent calls the system 2 is able to support.
4. One concurrent A party IVR validation procedure for a given IP address or segment.

Access requests or call requests that are received that exceed the above rate limits (step 60) are queued (step 62) by the access system 2 and a user is presented with their position in the queue on a page sent to the web browser of the user's machine 22. The queue position display also includes expected time in the queue. A configurable queue size limit applies to each requesting IP address to prevent overuse of system resources.

The IVR validation check procedure is considered to have failed if an A party call is invalidated in that the call enters a ringing state and is abandoned or is connected and disconnected without the correct security code being entered into the telephone. This may occur if a requesting party at the machine 22 enters an A party number which is not theirs and a telephone 18 or 20 is rung which is not associated with the machine 22. The person who receives this call of course cannot see the displayed security code on the screen of the machine 22. Essentially this will be a prank A party call.

The above procedures of the first security level, in particular the rate limit (no. 5) regarding concurrent registration and the time limit in the cookie, essentially eliminate any prank B party calls and limit the number of prank A party calls to about 2 to 6 per minute. The additional protection procedures in the additional control levels below limit the number of prank A party calls further so that only a few calls can be made.

The second access control level (step 64) is entered if an IP address or segment fails a predetermined number, say n, IVR verifications or checks within the last 24 hours. The default for n would be 2. The purpose of this level is to execute additional tests on the user to ensure that a person is controlling the machine 22 and generating the access requests, as opposed to an automated program or hack. The tests in this level do not require the user to download any software to their computer 22.

The tests which are executed include the following:
1. A security code is again sent by the access control server 6 to the machine 22 for display and the IVR 8 instructed to call the A party telephone 16 and prompt for the security code to be entered. In this instance, however, the security code is presented in a graphic format, i.e. as a bitmap image. This will defeat any automated program which is simply looking for the code in a text based format, and will require any hacker to adjust the hacking program to incorporate optical character recognition which is sufficiently accurate to extract the security code.
2. Script or an applet is sent from the access control system to the machine 22 which is configured to scan the machine to detect an automatic continually iterative hacking program which may be making the access requests. This could be detected by a hacker.
3. The access control system 6 runs a check procedure to determine whether the HTTP requests from the machine 22 include data associated with normal use of most browsers, such as Netscape NavigatorJ and Microsoft Internet ExplorerJ, and which would not normally be returned by a hacking program.
4. A time based test is executed also by the access control server 6 to detect whether the access requests are made faster than would be possible if the machine 22 was under human control.

Other remote checks for program control can also be executed.

This control level reduces the attack rate further by forcing a hacker to consider how to meet the above tests. This will take some time, believed to be at least 24 hours.

An IP address or segment at this control level will return to the first control level within 24 hours if no additional IVR verification failures occur (steps 66 and 68). This will ensure that IP addresses randomly assigned by an Internet service provider (ISP) are not blocked simply because a hacker has generated a few prank calls.

The third access control level (step 70) is entered if an IP address or segment fails o IVR tests, within 24 hours from the first access request, where o is greater than n.

In this control level, the access control server 6 sends a prompt to the user's machine 22 to download software to the machine 22. When a request for the software is received, the access control server 6 sends the software which, when stored on the machine 22, ensures all future communications between the machine 22 and the systems 2 and 4 is executed using a secure encrypted communications protocol. This prevents a hacker from determining the data passed between the machine 6 and the access control server 6 in all future communications. It also allows the downloaded software to examine the user's machine 22 and send investigative data securely back to the access control system 6 to detect if a person or program is controlling the machine 22. Again, a hacker, after some time, may be able to break the encrypted communication protocol and create a wrapper program which mimics the downloaded software so that the hack can continue using the protocol to access the system 4. Again the time needed to break this control level is assumed to be at least 24 hours (see steps 66 and 68).

A machine 22 at the third control level returns to the first control level status within 48 hours from the initial access request if no additional IVR check failures occur. This is done, as mentioned previously, to allow release of IP addresses randomly assigned by ISPs.

An IP address or segment will reach the fourth control level (step 72) and remain in this state until manually cleared by an operator of the system 2 if the IP address or segment has failed o+1 IVR checks. This level is used to block the IP address or segment which is considered to be unverified. All access requests from the IP address or segment is refused. The block is made as close as possible to the machine 22, preferably at a router level, in the network 30 to reduce the performance impact of a continuous attack. Accordingly the attack is reduced further by blocking the IP address or segment as close as possible to where the attack originates, which can block an entire proxy server.

The access control server 6 executes a reverse Domain Name Server (DNS) lookup procedure to determine the manager of the domain associated with the IP address or segment and then sends an e-mail message to the manager advising the block has occurred. A copy of the e-mail is also sent to inform the operator of the systems 2 and 4.

Many modifications will be apparent to those skilled in the art without departing from the scope of the present invention as herein described with reference to the accompanying drawing.

The invention claimed is:

1. An access control method performed by an access control system, including:
   receiving an access request for a service from a data processing apparatus;
   sending unique identification data to said apparatus in response to said access request;
   applying an access rate limit for verifying access to said service, using an access request queue, until said identification data is received from a user of said apparatus and verified by said access control system, wherein verifying said identification data corresponds to a first level of access control; and
   applying at least one additional different level of access control following a predetermined number of failed attempts to verify said identification data by said user of said apparatus, including invoking sequentially the different levels of access control depending on the number of failed attempts to verify said identification data by said user for access requests over predetermined periods of time.

2. An access control method as claimed in claim 1, wherein said identification data is a random unique security code; and
   said apparatus is sent a unique identification number for the apparatus, for sending with subsequent access requests and which expires if the security code is not verified within a predetermined period of time.

3. An access control method as claimed in claim 1, wherein said identification data is verified by contacting an independent communications device with a known association to said user and said data processing apparatus, and having said user provide said identification data using said device.

4. An access control method as claimed in claim 1, wherein said identification data is verified by said access control system by receiving said identification data from said user using an independent communication means having a known association to said user and said data processing apparatus.

5. An access control method as claimed in claim 2, wherein said at least one additional level includes detecting generation of access requests for said service under control of a program instead of under control of said user.

6. An access control method as claimed in claim 5, wherein said at least one additional level of access control includes sending communication software to said apparatus to receive access requests for said service under an additional communication protocol and said at least one additional level of access control includes blocking all access requests by said data processing apparatus, and wherein said detecting is a second level of access control, said sending of said communication software and execution of said additional communication protocol is a third level of access control, and said blocking is a fourth level of access control.

7. An access control method as claimed in claim 1, wherein said at least one additional level of access control includes sending communication software to said apparatus to receive access requests for said service under an additional communication protocol.

8. An access control method as claimed in claim 7, wherein said communication software encrypts said access requests.

9. An access control method as claimed in claim 6, wherein said blocking involves denying all access requests that include address data or said unique identification number that corresponds to said data processing apparatus.

10. An access control system having components for executing the steps of the access control method as claimed in claim 1.

11. Access control software stored on a computer system, having code for executing the steps of the access control method as claimed in claim 1.

12. An access control method as claimed in claim 4, wherein said independent communications means is a telephone of the user.

13. An access control method as claimed in claim 1, wherein said unique identification data is sent in a graphic format and received from said user in a different format.

14. An access control method as claimed in claim 5, wherein said detecting includes sending the unique identification data in a graphic format, and requesting a response in a different format.

15. The access control method of claim 1, wherein the step of applying the access rate limit for verifying access to said service comprises placing the access request in the access request queue when the rate limit is exceeded.

16. The access control method of claim 1, wherein the access rate limit limits a number of access requests from said data processing apparatus over a period of time, until said user of said apparatus sends said unique identification data, and said unique identification data is verified.

17. An access control method performed by an access control system, including:
 receiving an access request for a service from a data processing apparatus;
 sending unique identification data to said apparatus in response to said access request, wherein said identification data is a random unique security code, and said apparatus is sent a unique identification number for the apparatus, for sending with subsequent access requests and which expires if the security code is not verified within a predetermined period of time;
 applying an access rate limit for verifying access to said service, using an access request queue, until said identification data is received from a user of said apparatus and verified by said access control system, wherein verifying said identification data corresponds to a first level of access control; and
 applying at least one additional different level of access control following a predetermined number of failed attempts to verify said identification data by said user of said apparatus;
 wherein said at least one additional level includes detecting generation of access requests for said service under control of a program instead of under control of said user, and said at least one additional level of access control includes sending communication software to said apparatus to receive access requests for said service under an additional communication protocol, and wherein said detecting is a second level of access control, and said sending of said communication software and execution of said additional communication protocol is a third level of access control.

18. An access control method as claimed in claim 17, wherein said at least one additional level of access control includes a fourth level of access control involving blocking all access requests by said data processing apparatus.

19. An access control method as claimed in claim 18, wherein said blocking involves denying all access requests that include address data or said unique identification number that corresponds to said data processing apparatus.

20. An access control method as claimed in claim 19, wherein the address data is an IP address or segment.

21. An access control method as claimed in claim 18, wherein said blocking is at a router level close to said apparatus.

22. An access control method executed by a computer system, including:
 invoking a first control level applying an access rate limit, using an access request queue, and attempting to verify said user;
 invoking a second control level applying hack program detection tests to said access requests and attempting to verify said user;
 invoking a third control level requiring use of predetermined download software for transmitting said access requests and attempting to verify said user;
 invoking a fourth control level blocking access to said service on the basis of at least one communications address corresponding to said access requests; and
 invoking said control levels sequentially depending on a number of failed attempts to verify said user;
 wherein attempting to verify said user comprises sending unique identification data to said user, receiving identification data from said user in response to the sent identification data, and verifying the received identification data.

23. An access control method as claimed in claim 22, wherein said user is verified by contacting an independent communications device with a known association to said user and said data processing apparatus, and having said user provide identification data using said device.

24. An access control method as claimed in claim 3 or 23, wherein said independent device is a telephone of the user.

25. The access control method of claim 22, wherein the rate limit limits a number of access requests from said data processing apparatus over a period of time, until said user of said apparatus sends said unique identification data, and said unique identification data is verified.

26. An access control system, including:
 an access control server for receiving access requests for a service from a data processing apparatus, rate limiting access to the server, using an access request queue, until a user of said apparatus is verified, and sending to said data processing apparatus unique identification data; and an interactive voice response system for contacting an independent communications device having an association with said user and said data processing apparatus, issuing a request for said identification data, and providing the identification data received from said user in response to said request to said access server in order to verify said user.

27. An access control system as claimed in claim 26, wherein said independent device is a telephone of said user.

28. The access control method of claim 26, wherein the rate limit limits a number of access requests from said data processing apparatus over a period of time, until said user of said apparatus sends said unique identification data, and said unique identification data is verified.

\* \* \* \* \*